United States Patent
Oldham

[11] 3,868,578
[45] Feb. 25, 1975

[54] METHOD AND APPARATUS FOR ELECTROANALYSIS

[75] Inventor: Keith B. Oldham, Peterborough, Ontario, Canada

[73] Assignee: Canadian Patents and Development Limited, Ottawa, Ontario, Canada

[22] Filed: Oct. 2, 1972

[21] Appl. No.: 293,780

[52] U.S. Cl. ............ 328/127, 328/128, 333/19, 333/20
[51] Int. Cl. ............ G06g 7/18
[58] Field of Search ........ 328/127, 128; 333/19, 20, 333/23

[56] References Cited
UNITED STATES PATENTS
3,051,883   8/1962   Smith.............................. 333/20 X OTHER PUBLICATIONS
Korn and Korn, Electronic Analog Computers, 2nd Edition, McGraw Hill Book Company, 1956, pg. 13.

Primary Examiner—John Zazworsky
Attorney, Agent, or Firm—James R. Hughes

[57] ABSTRACT

An electrical circuit for providing an output signal having a mathematical operation relationship to an input signal, said operation being either that of semi-integration or semi-differentiation, said circuit including an electrical transmission line. The practical circuit for the transmission line comprises a simulated, lumped-constant line made up of a number of series resistance and shunt capacitance elements or series inductance and shunt resistance units. The preferred circuit for effecting semi-integration or semi-differentiation comprises an operational amplifier having a transmission line either in the feedback or in the input. This feedback or input element may take the form of a long (theoretically infinite) transmission line, e.g. a coaxial cable or a lumped constant network of suitably chosen resistance and reactance elements. For electroanalytical measurements the semi-integrating circuit is connected to electrodes positioned in the solution to be measured. Provision is made for applying two predetermined DC voltage levels to the electrodes with the operational amplifier semi-integrating the current flowing between electrodes.

10 Claims, 10 Drawing Figures

METHOD AND APPARATUS FOR ELECTROANALYSIS

This invention relates to a method and electrical apparatus for performing a mathematical operation and more particularly to an electroanalytical method and apparatus incorporating an electrical circuit for carrying out the mathematical operation of semi-integration useful in electrochemical measurement and analysis.

The mathematical concepts of semi-integration and semi-differentiation are known but have not been studied or examined in any great detail nor have they been applied in any practical or purposeful way. These operations may be considered to lie intermediate between the multiplication (linear scaling) operation and the integration or differentiation operations. The operator symbols for semi-integration and semi-differentiation with respect to time are usually written for the function $f(t)$ as:

$$d^{-1/2}/dt^{-1/2}f(t) \text{ AND } d^{-1/2}/dt^{-1/2}f(t) \quad (1)$$

one of these operations being in most respect the inverse of the other.

Electrically, differentiation and integration may be achieved by circuits using configurations of resistance and capacitance and also resistance and inductance although the latter is normally not too practical. Circuits for semi-integration and semi-differentiation are not known or in any practical use.

Operational amplifiers are well known and in widespread use for various purposes including use as a scaler (resistance feedback), as an integrator (capacitance feedback), and a differentiator (resistance feedback with capacitance in the input). Considering first a scaler with feedback resistance R, an output voltage $V(t)$ is obtained from an input current $i(t)$ as follows:

$$V(t) = Ri(t) \quad (2)$$

For an integration with feedback capacitance C, the voltage output is $$V(t) = \frac{1}{C}\int_0^t i(t)dt \equiv \frac{1}{C}\frac{d^{-1}}{dt^{-1}}i(t) \quad (3)$$

For semi-integration the outputs voltage function would lie intermediate between equations (2) and (1) and is given by the following:

$$V(t) = \sqrt{R/C}\, d^{-1/2}/dt^{-1/2}i(t) \quad (4)$$

R and C being feedback elements to be explained later.

Semi-differentiation is accomplished by inverting equation (4) thus:

$$i(t) = \sqrt{C/R}\, d^{1/2}/dt^{1/2} V(t) \quad (5)$$

There are in existence at the present time several electroanalytical methods for detecting the presence and measuring the concentrations of certain chemical substances dissolved in liquids, the best known although not always the most efficient being polarography. The substances which are detectable and able to be analysed are of the class known as "electroactive" and include numerous metallic ions (e.g. lead, cadmium, mercury), dissolved oxygen, and many organic compounds. It is usually desired to measure concentrations in millimole $^{-1}$ region, i.e., a few parts per billion. An important measurement at the present time is that of dissolved oxygen in water for water resource and pollution studies. All existing electroanalytical methods have certain common features. The solution to be analyzed is placed in an electrochemical cell along with two or three electrodes, the crucial one of which is termed the working electrode. An electrical signal is applied to the cell and the response is measured as a function of time. The form of applied signal and the way in which the response is measured vary from method to method but the most common is to apply a precisely known voltage signal waveform and to measure the current flowing in the working electrode. The current versus time curve (or occasionally the curve versus time of the integral of the current) is recorded and from some feature (a maximum, an inflection, or a plateau) of the curve, the concentration of electroactive substance is calculated.

With all existing electroanalytical methods it is essential that the signal applied to the working electrode have a precisely-known form in order that the relationship between the concentration and the current time curve be predetermined. Because voltages can be applied only to the overall cell and not to the working electrode itself, this imposes a restriction on the cell resistance which therefore must be kept low. This in turn means that salts must be added to the solution to be analyzed to improve its conductivity. Analyses in situ such as in a flowing river are thereby precluded. Another drawback to present methods is the complexity of the apparatus involved. This arises in part from the need to apply precise voltage signals and in part from the need to display the current-time curve in two dimensions.

It is an object of the present invention to provide an electrical circuit that will generate an output signal related to the semi-integral or the semi-derivative of the input signal.

It is another object of the invention to provide an electroanalytical method and apparatus for detection and measurement of certain substances dissolved in a liquid.

It is another object of the invention to provide an electroanalytical method and apparatus incorporating a semi-integration circuit.

It is another object of the invention to provide an electroanalytical method and apparatus involving electrodes in the solution to be measured in which the measurement largely is independent of the form of the voltage signal applied to the measuring apparatus.

It is another object of the invention to provide an electrochemical analysis apparatus wherein the resistance between electrodes is largely irrelevant and solutions without added salts may be readily analyzed.

These and other objects of the invention are achieved by an electrical circuit for providing an output signal having a mathematical operation relationship to an input signal, said operation being either that of semi-integration or semi-differentiation, said circuit including an electrical transmission line. The practical circuit for this comprises a simulated, lumped-constant line made up of a number of series resistance and shunt capacitance elements or series inductance and shunt resistance elements.

The preferred circuit for effecting semi-integration or semi-differentiation comprises an operational amplifier having a transmission line either in the feedback or in the input. The feedback or input element may take the form of a long (theoretically infinite) transmission line, e.g. a coaxial cable or more practically a simulated transmission line formed of a lumped constant network or suitably chosen resistance and reactance elements. For electroanalytical measurements the semi-integrating circuit is connected to electrodes positioned in the solution to be measured. Provision is made for applying two predetermined DC voltage levels to the electrodes with the operational amplifier semi-integrating the current flowing between electrodes.

In drawings which illustrate embodiments of the invention,

Figure 3:
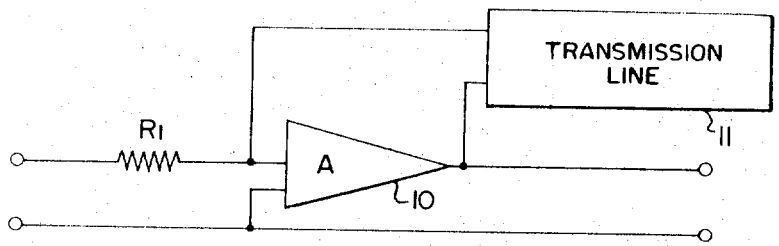
FIG. 3 is an operational amplifier semi-integrating circuit with transmission line feedback.
Figure 3A:
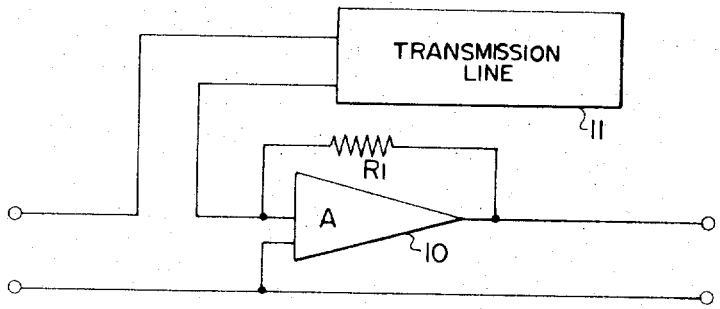
Figure 4:
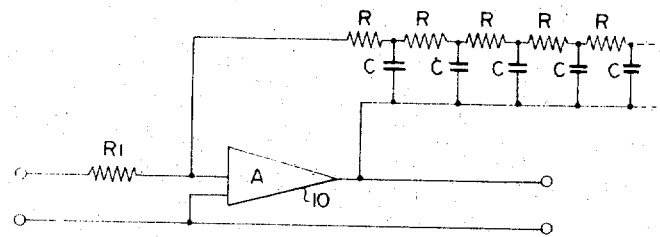
Figure 5:
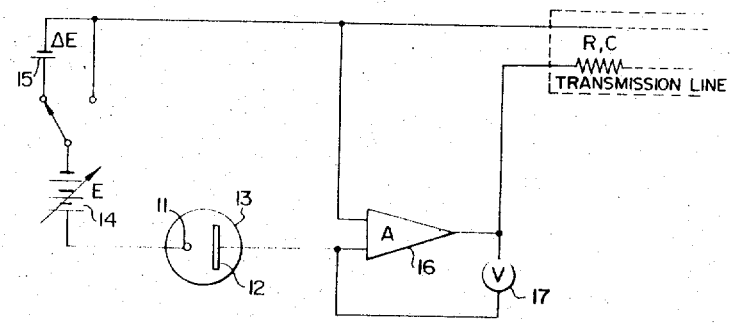
Figure 6:
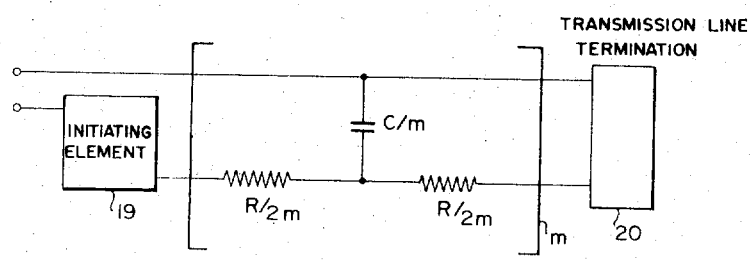
Figure 9:
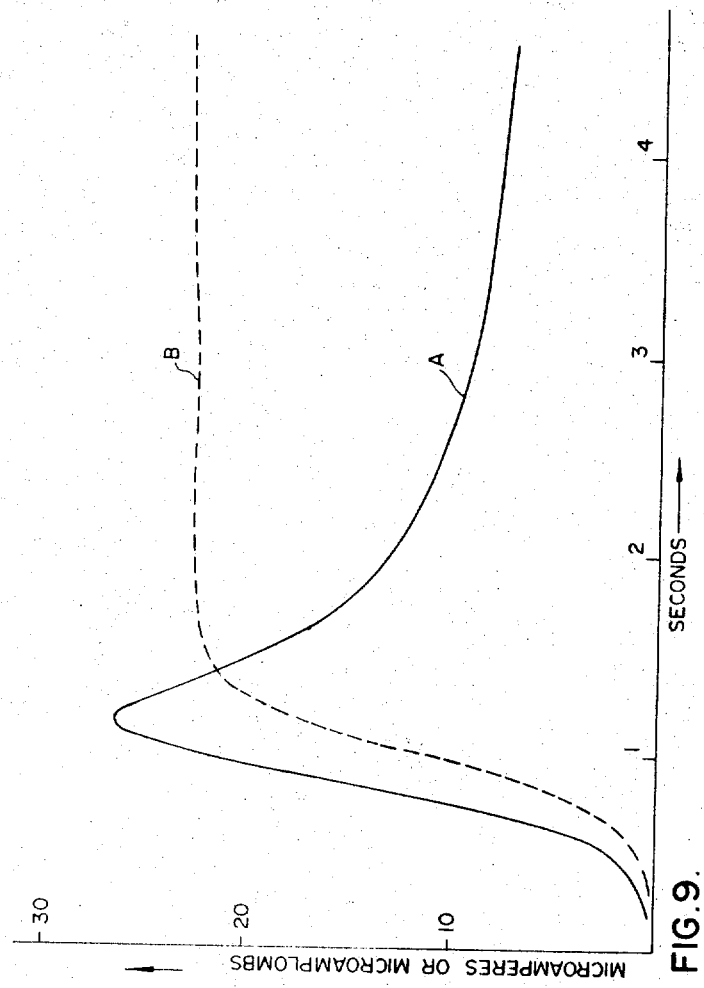
Figure 7:
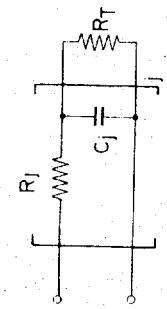
Figure 8:
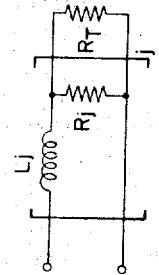

FIG. 3A is an operational amplifier semi-differentiating circuit with transmission line in input, FIG. 4 is the same as FIG. 3 but with an R-C network feedback impedance, FIG. 5 is an electroanalytical apparatus incorporating a semi-integration readout circuit, FIG. 6 is a lumped constant repeatable section for the impedance feedback of the amplifier, FIG. 7 is a suitable R-C network, FIG. 8 is a suitable L-R network, and FIG. 9 is a graph comparing current versus time curve output with a semi-integrated current versus time curve output.

Figure 1:
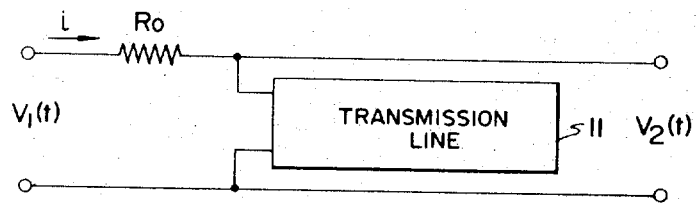
FIG. 1 is a simple circuit for semi-integration.

Referring to FIG. 1 a simple circuit for semi-integration has a resistor $R_o$ in series with the input of a transmission line with the output taken across the transmission line. For semi-differentiation the resistor $R_o$ and the voltage $V_1(t)$ and the output voltages $V_2(t)$ or $V_3(t)$ are related by either $$V_2(t) = 1/Ro \ \sqrt{R/C} \ d^{-1/2}/dt^{-1/2} \ V_1(t)$$

(6)

$$V_3(t) = Ro \ \sqrt{C/R} \ d^{-1/2}/dt^{-1/2} \ V_1(t)$$

Figure 2:
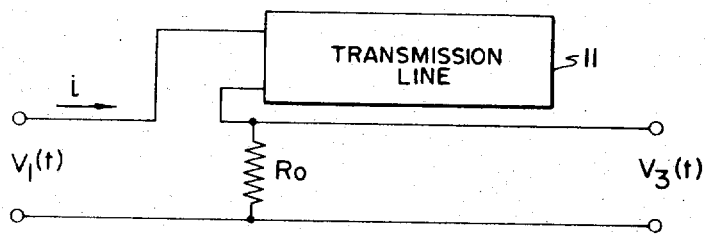
FIG. 2 is a simple circuit for semi-differentiation.

(7)

so that the current is proportional to the semi-derivative of the voltage and the voltage is proportional to the semi-integral of the current. The circuit configuration of FIGS. 1 and 2 take advantage of this relationship to provide the desired operations. In the above formulas R and C denote the total resistance and capacitance of the transmission line. For a lumped-constant line this is the total resistance and capacitance up to any node in the network. It should be pointed out that the value of $R_o$ has to be properly chosen to make these circuits operate in this manner. For the first circuit the impedance of $R_o$ should be large compared to that of the transmission line and in FIG. 2 it should be small.

Referring to FIG. 3 an operational amplifier that will provide the mathematical operation of semi-integration is made up of the standard high gain amplifier 10 with input resistance $R_1$ and a feedback connection that is in essence the input to a transmission line. The transmission line is theoretically infinite and made up of distributed resistance and capacitive components. A very long section of non-inductive coaxial cable, for example, would operate giving the necessary solution to the semi-integration operation i.e., as given by equation (4) above. The ratio R/C of the equation is the ratio of the resistance to the capacitance of the transmission line. For semi-differentiation the input resistor $R_1$ and the transmission line are reversed as shown in FIG. 3A. It should be pointed out that resistance $R_1$ is not needed in the circuit if an input current is to be semi-integrated.

It will be realized of course that a long transmission line is impractical for reasonable working circuits. FIG. 4 shows a circuit with lumped constant R-C elements and it has been found that if a network of only a few sections say 6 or 7 or more are used then the mathematical operation to good precision is achieved for a useable time interval.

FIG. 5 shows the basic electroanalytical apparatus for detection and measurement purposes. A working electrode 11 and a second (counter) electrode 12 are positioned in a suitable sample cell 13 containing the liquid to be analysed. This cell is not necessary and in fact the apparatus could be used to test flowing liquids in situ e.g. dissolved oxygen or contaminants in lakes and streams. The electrodes may be standard in structure with a working electrode of mercury being preferred because of its easy renewability. Other types such as platinum and carbon may be used. DC voltage sources 14 and 15 provide a voltage E plus a voltage step $\Delta E$ and this is applied to the electrodes causing a current $i(t)$ to flow in the electrodes. An operational amplifier 16 with transmission line feedback (R, C), semi-integrates this current and provides the semi-integrated output to a suitable meter or recorder, e.g. voltmeter 17. It is necessary to provide a voltage excursion from one predetermined level to another and this is the reason for the $\Delta E$ source 15. It is, however, not necessary to know precisely the form of this voltage function other than the two levels E and E + $\Delta E$.

Analysis by this technique may be for a species which is reducible or oxidizable. For example an oxidizable species, denoted by $Rd$, may be present in solution, e.g. an aqueous solution at a concentration ($Rd$) of order $10^{-7}$ to $10^{-5}$ mole cm$^{-3}$. The electrooxidation reaction

(8)

occurs at a working electrode (WE) which is immersed in the solution to be analysed along with another electrode which serves the joint function of counter and reference electrode. Typically the area (A) of the working electrode is of order $10^{-2}$ to $10^{-1}$ cm$^{-2}$. The above reaction does not occur significantly when the working electrode has a potential E versus the second electrode but occurs so rapidly when the cell potential is charged to E + $\Delta E$ that the concentration of Rd at the surface of the electrode is soon reduced virtually to zero. Electrochemical theory shows $\Delta E$ may be as small as 0.24/n volts if the oxidation is reversible and about twice this value for an irreversible process.

Prior to the analysis period the working electrode is maintained at potential E so that the electrooxidation does not occur and $Rd$ is uniformly distributed throughout the solution. At time $t = O$ the applied potential is switched to E + $\Delta E$. The time-dependent faradaic current $i(t)$ which flows in response to this change in applied potential is an extremely complicated function and depends not only on $\Delta E$ and concentrations $[Rd]$ but also on the cell resistance $\rho$ and the kinetics of the electrode reaction. For this reason direct measurement of current $i(t)$ under these circumstances has little analytical value.

It has been found and can be shown that the semi-integral of the current defined by $$m(t) = d^{-1/2}/dt^{-1/2} i(t)$$

soon becomes equal to a constant given by $$m = nAF[Rd] \sqrt{D}$$

where A is the effective area of the electrode F is Faraday's constant ($10^5$ coulomb equiv$^{-1}$) and D is the diffusion coefficient of $Rd$ (typical value: approximately $10^{-5}$ cm$^2$ sec$^{-1}$). The important point to be stressed is that the constant m is independent of the kinetics of the reaction and is unaffected by $\Delta E$ or $\rho$. It is, however, as the formula shows directly proportional to $[Rd]$, the concentration of the species for which analysis is required. The semi-integral $m(t)$ becomes equal to the constant $m$ as soon as the concentration of $Rd$ at the electrode surface becomes effectively zero and this takes a time of the order $$D (nAFC\rho /\Delta E)^2$$

which depends on both $\Delta E/n$ and $\rho$. Giving the former the value of 0.4 volts and the other constants their typical values, it is found that the semi-integral becomes constant within one second even for a cell resistance of 40,000 ohms. For the much lower resistance usually encountered in electrolyte solutions, $m(t)$ becomes constant almost instantaneously.

This leads to a generally simple to perform, practical measuring technique. Other advantages of the method include:

1 Values of E and $\Delta E$ are not crucial. The values need not be accurately known, nor need they be particularly constant. Hence no precision voltage sources are needed.

2 Unlike some other electroanalytical techniques, the way in which the applied potential changes from E to $E + \Delta E$ is not critical, not needing to be a step function with a sharp risetime. The closure of an ordinary switch is quite adequate. Indeed it is possible for the voltage to rise quite gradually from E to $E + \Delta E$ as by a ramp signal or by using a capacitor to make the final applied potential approach $E + \Delta E$ asympotically 3. Cell resistances of the order of tens of thousands of ohms can be tolerated. Such resistance magnitudes are associated with electrolyte concentrations in the $10^{-3}$ to $10^{-4}$N range, so that the normal electroanalytical requirement of excess supporting electrolyte may be dispensed with.

4. Two electrodes only are needed, rather than the three which are nowadays used in most electroanalytical techniques. On the hand, the present method may be adapted to three electrode practice with beneficial results as regards precision and tolerance to cell resistance.

5. The analysis period may occupy a small fraction of a second and will then perturb only the region immediately adjacent to the working electrode. Hence convection currents cause only limited interference, permitting use in flowing systems.

6 Because the potential never exceeds $E + \Delta E$, there can be no interference from species which oxidize at more positive potentials. Interference from species which oxidize at potentials less than E will be minimal because such species will have become exhausted in the vicinity of the electrode on account of the prolonged prepolarization at potential E.

7. As will all electroanalytical techniques, double-layer charging is an interference which becomes increasingly troublesome as concentration $[Rd]$ decreases. With the present technique, however, since the semi-integral of the nonfaradaic current declines continuously, the interference can be diminished by increasing the analysis time. In any case, several simple methods exists for correcting for this interference.

8. The sought concentration is proportional to a single measured quantity, no graphical display being needed. Oscilloscopes, stripchart or X-Y recorders are therefore unnecessary, a simple meter or digital device sufficing. Direct reading in concentration units is possible.

Referring to FIG. 6, a lumped constant method of providing a simulated transmission line section is illustrated. Block 19 denotes an initiating element (a group of atypical circuit components designed to give a good "match" at short times) and block 20 a transmission line termination. Referring to equation (4) given above, it is the ratio R/C that provides the semi-integration constant. This may be achieved by a number ($m$) of T-sections made up of resistors and capacitors having the values $R/2m$ and $C/m$.

FIG. 7 shows a specific network using resistors $R_j$ and capacitors $C_j$. In apparatus built and tested typical values for these (in megohms and microfarad) were as follows:

| j | $R_j$ | $C_j$ |
|---|---|---|
| 1 | .0499 | .0100 |
| 2 | .100 | .100 |
| 3 | .110 | .100 |
| 4 | .121 | .150 |
| 5 | .182 | .220 |
| 6 | .267 | .330 |
| 7 | .392 | .480 |
| 8 | .562 | .680 |
| 9 | .825 | 1.010 |
| | $R_T = 4.29$ | |

These values are not extremely critical and were chosen generally to minimize the number of components required and to make the value $\sqrt{\Sigma R/\Sigma C}$ as close as possible to predetermined value in this specific example. $\Sigma R$ and $\Sigma C$ denote total resistance and capacitance to any node in the network, the individual $R_j$ and $C_j$ values being so selected that the ratio $\Sigma R/\Sigma C$ is almost constant (apart from the first few and the last few nodes). It has been found that good results are obtained with only a few sections, in this case nine. Rather than use identical components in each section, as FIG. 6 it is more economical to use gradually increasing values as tabulated here.

It is also possible to use an LR network and a typical arrangement is shown in FIG. 8. As explained above the LR network would semi-differentiate if used in the feedback loop of an operational amplifier; for use as a semi-integrator, the LR network is placed in the input to the operational amplifier. The equivalent equation o that of equation (4) becomes when the number of the sections $j$ approaches infinity:

$$V = \sqrt{RL}\, d^{-1/2}/dt^{-1/2} i(t) \quad (11)$$

The voltage and current at the terminals of the work shown in FIG. 8 are interrelated by $$V = \sqrt{\Sigma L/\Sigma G}\, d^{1/2}/dt^{1/2} i \quad (12)$$

and $$i = \sqrt{\Sigma G/\Sigma L}\, d^{-1/2}/dt^{-1/2} V \quad (13)$$

so that in this case it is the voltage that is proportional to the semi-derivative of current and current that is proportional to the semi-integral of voltage. Here $\Sigma L$ denotes the total inductance up to a particular node and $\Sigma G$ is the total conductance i.e.

$$\Sigma G = {}_j\Sigma\, 1/R_j$$

For best operation it is preferable to keep the ratio $\Sigma L/\Sigma G$ close to a constant in the mid section of the network. In practice it is likely that an LR network would be more costly and inconvenient than a RC one.

A graph comparing results obtained from electroanalytical apparatus where the working electrode current $i(t)$ has been recorded (a) unchanged (curve A in amperes) and (b) semi-integrated (curve B in amplombs) shown in FIG. 9. The amplomb is the name given to the unit intermediate between the ampere and the coulomb; amplomb $\equiv$ ampere second$^{1/2}$ $\equiv$ coulomb second$^{-1/2}$. It will be seen that the full current curve contains a preliminary peak followed by a falling off making this curve hard to interpret and evaluate. The semi-integration curve rises to a steady-state value after only a very few seconds and this level can be used to determine concentration levels. It is expected that the above measurement method which might be called "semi-integral electroanalysis" should have wide application in concentration studies. The detection and measurement of dissolved oxygen in water, and substances such as mercury, cadmium, lead in liquids come readily in mind. The apparatus is generally simple and easy to operate not only in the laboratory but in the field and would therefore lend itself to the pressing need for more extensive pollution data.

What is claimed:

1. An electrical circuit for providing an output signal having a mathematical operation relationship to an input signal, said operation being semi-integration, comprising a resistance element and an operational amplifier in series, the input being applied across the said resistance element and the operational amplifier input, the output being taken across the output of the operational amplifier, the said operational amplifier having a feedback path from output to input connected to the input of a long transmission line section.

2. An electrical circuit as in claim 1 wherein the electrical transmission line is a simulated lumped-constant line made up of a number of series resistanace and shunt capacitance elements of preset values with the ratio of resistance to capacitance in each element being predetermined.

3. An electrical circuit for providing an output signal having a mathematical operation relationship to an input signal, said operation being semi-differentiation, comprising a long transmission line section and an operational amplifier in series, the input being applied across the input to the transmission line and the input to the amplifier and the output taken from the output of the operational amplifier, said operational amplifier having a feedback path from output to input including a resistance element.

4. An electrical circuit as in claim 3 wherein the electrical transmission line is a simulated lumped-constant line made up of a number of series resistance and shunt capacitance elements of preset values with the ratio of resistance to capacitance in each element being predetermined.

5. An electrical circuit for providing a semi-integration operation output according to the following equation $$V = \sqrt{R/C}\, d^{-1/2}/dt^{-1/2}\, i(t)$$

where V is the output voltage of the circuit, $i(t)$, is the input current, the ratio R/C being a predetermined and preset constant, comprising a high gain amplifier having a feedback path connected to the input of a simulated transmission line network made up of a number of series resistance and shunt capacitance elements, the ratio of the summed effective value of the resistance to that of the summed effective value of the capacitances being such as to approximate the ratio R/C of the said equation.

6. An electrical semi-integration circuit as in claim 5 wherein the number of elements is three or more.

7. An electrical circuit for providing a semi-differentiation operation output according to the following equation $$V = \sqrt{C/R}\, d^{1/2}/dt^{1/2} i(t)$$

where V is the output voltage of the circuit, $i(t)$ is the input current, and the ratio C/R being a predetermined and preset constant, comprising a high gain amplifier having a resistance feedback path and having its input in series with the input of a simulated transmission line network made up of a number of series resistance and shunt capacitance elements, the ratio of the summed effective value of the resistance to that of the summed effective value of the capacitances being such as to approximate the ratio C/R of the said equation.

8. An electrical semi-differentiation circuit as in claim 7 wherein the number of elements is three or more.

9. An electrical circuit for providing an output signal having a mathematical operation relationship to an input signal, said operation being semi-integration, comprising an electrical transmission line and a resistance element with the input to the electrical transmission line connected in series with the said resistance element, the input of the circuit being applied across the series resistance element and transmission line and the output being taken across the input to the transmission line and wherein the electrical transmission line is a simulated lumped-constant line made up of a number of series resistance and shunt capacitance elements of preset values with the ratio of resistance to capacitance in each element being predetermined.

10. An electrical circuit for providing an output signal having a mathematical operation relationship to an input signal, said operation being semi-differentiation comprising an electrical transmission line and a resistance element with the input to the electrical transmission line connected in series with the said resistance element, the input of the circuit being applied across the series resistance element and transmission line and the output being taken across the resistance element and wherein the electrical transmission line is simulated lumped-constant line made up of a number of series resistance and shunt capacitance elements of present values with the ratio of resistance to capacitance in each element being predetermined.

* * * * *